(12) United States Patent
Abbott

(10) Patent No.: US 10,210,742 B2
(45) Date of Patent: Feb. 19, 2019

(54) CARRYING BAG HAVING A BUILT-IN CHECKLIST

(71) Applicant: Marcella Abbott, Oceanside, NY (US)

(72) Inventor: Marcella Abbott, Oceanside, NY (US)

(73) Assignee: Packology, LLC, Oceanside, NY (US)

( * ) Notice: Subject to any disclaimer, the term of this patent is extended or adjusted under 35 U.S.C. 154(b) by 0 days.

(21) Appl. No.: 15/819,134

(22) Filed: Nov. 21, 2017

(65) Prior Publication Data

US 2018/0144607 A1    May 24, 2018

Related U.S. Application Data

(60) Provisional application No. 62/424,603, filed on Nov. 21, 2016.

(51) Int. Cl.
| | |
|---|---|
| G08B 1/08 | (2006.01) |
| G08B 21/24 | (2006.01) |
| A45C 5/03 | (2006.01) |
| A45C 13/02 | (2006.01) |
| H04L 29/08 | (2006.01) |
| G08B 25/10 | (2006.01) |
| A45C 15/02 | (2006.01) |
| A45C 5/14 | (2006.01) |

(52) U.S. Cl.
CPC ............... *G08B 21/24* (2013.01); *A45C 5/03* (2013.01); *A45C 5/14* (2013.01); *A45C 13/02* (2013.01); *A45C 15/02* (2013.01); *G08B 25/10* (2013.01); *H04L 67/125* (2013.01); *A45C 2200/10* (2013.01)

(58) Field of Classification Search
CPC .......... G08B 21/24; G08B 25/10; A45C 5/03; A45C 13/02; A45C 15/02; A45C 2200/10; A45C 5/14; H04L 67/125
USPC ........................................... 340/539.13
See application file for complete search history.

(56) References Cited

U.S. PATENT DOCUMENTS

| | | | | |
|---|---|---|---|---|
| 5,636,733 A | * | 6/1997 | Marchwiak | A45C 3/004 190/18 A |
| 6,213,266 B1 | * | 4/2001 | Hollingsworth | A45C 5/14 150/111 |
| 6,220,318 B1 | * | 4/2001 | Pinti | A45C 3/06 150/103 |
| 7,323,988 B2 | * | 1/2008 | Krstulich | G08B 13/1427 340/539.13 |
| 7,367,449 B2 | * | 5/2008 | Kaminski | A45C 11/16 206/1.5 |
| 7,900,757 B2 | * | 3/2011 | Sisitsky | A45C 1/024 150/113 |
| 7,916,025 B2 | * | 3/2011 | Locker | G08B 21/24 340/539.11 |

(Continued)

*Primary Examiner* — Zhen Y Wu
(74) *Attorney, Agent, or Firm* — Schmeiser, Olsen & Watts LLP; Anthony L. Meola

(57) ABSTRACT

We have discovered an item of luggage having configurable labelled compartments with a corresponding chart for the labeled compartment. A user can track the status of items to packed into the item of luggage. Also disclosed is the item of luggage having at least one sensor that communicate with a mobile device application to electronically update a user's parent as to the status of the packing. Additionally, the item of luggage can provide real time location and content data to a user's parent in order to track the location of the item of luggage as well as the soil level of the contents contained therein.

5 Claims, 3 Drawing Sheets

(56) References Cited

U.S. PATENT DOCUMENTS

| | | | | |
|---|---|---|---|---|
| 9,027,721 | B1* | 5/2015 | Osborne | A45C 5/06 190/101 |
| 9,286,440 | B1* | 3/2016 | Carter | G06F 19/00 |
| 9,566,704 | B1* | 2/2017 | Stoikos | B25H 3/02 |
| 9,630,751 | B1* | 4/2017 | Otto | B65G 17/20 |
| 2003/0226730 | A1* | 12/2003 | Platte, III | A45C 3/02 190/103 |
| 2004/0020813 | A1* | 2/2004 | Moeller | A45C 11/00 206/425 |
| 2006/0006097 | A1* | 1/2006 | Peacock | A45C 3/06 150/112 |
| 2006/0087432 | A1* | 4/2006 | Corbett, Jr. | G06Q 10/08 340/572.1 |
| 2008/0308568 | A1* | 12/2008 | Grenier | A45C 13/1084 220/810 |
| 2009/0294237 | A1* | 12/2009 | Sisitsky | A45C 1/024 190/103 |
| 2014/0151173 | A1* | 6/2014 | Reh | A45C 13/42 190/18 A |
| 2015/0154891 | A1* | 6/2015 | Baschnagel | B43L 1/00 40/331 |
| 2015/0257632 | A1* | 9/2015 | Ramsey | A61B 1/00144 206/204 |
| 2015/0342318 | A1* | 12/2015 | Arthur | A45C 13/262 280/655.1 |
| 2017/0019765 | A1* | 1/2017 | Hoyer | H04B 5/0075 |
| 2017/0101249 | A1* | 4/2017 | Hopkinson | A61B 50/00 |
| 2017/0188679 | A1* | 7/2017 | Jacob | H04W 76/10 |

* cited by examiner

|   |                                    |
|---|------------------------------------|
|   | Face Wash                          |
|   | Moisturizer                        |
|   | Deodorant                          |
|   | Cotton swabs                       |
|   | Bandage strips                     |
|   | Medicine (headache, fever, etc.)   |
|   | Razor/Shaving cream                |
|   | Make-up                            |
|   | Hair products                      |
|   | Hairdryer                          |
|   | Curling/Flat iron                  |
|   | Pony Tail holders                  |
|   | Headbands                          |
|   | Sunglasses                         |
|   | Phone                              |
|   | Laptop/Tablet                      |
|   | Chargers                           |
|   | Sweatshirt                         |
|   | Extra day bag                      |
|   | Shoes                              |
|   | Snacks                             |
|   | *Other:*                           |
|   |                                    |
|   |                                    |
|   |                                    |
|   |                                    |
|   | *Warm weather items:*              |
|   | Sunscreen                          |
|   | Bathing Suits                      |
|   | Flip-flops                         |
|   | Towel                              |
|   | Beach hat                          |
|   |                                    |
|   | *Cold weather items:*              |
|   | Hats                               |
|   | Gloves                             |
|   | Scarf                              |

FIG. 3

CARRYING BAG HAVING A BUILT-IN CHECKLIST

CROSS REFERENCE TO RELATED APPLICATIONS

The present application relates to and takes priority from co-pending U.S. provisional application Ser. No. 62/424,603, filed on Nov. 21, 2016 and entitled "CARRYING BAG HAVING A BUILT-IN CHECKLIST".

BACKGROUND OF THE INVENTION

1. The Field of the Present Invention

The present invention relates generally to carrying bags, such as duffle bags, travel bags and luggage. The invention consists of a bag with labeled organizational dividers having a separate linked compartment list in order to identify items inserted into the various bag compartments.

2. General Background

Existing luggage and carrying bags, such as suitcases and duffle bags, do not allow someone to view inside the bag. Without being able to see inside the bag, a user may not know or may forget what has been packed inside the bag. Further, current bags do not offer satisfactory organizational labeled compartments, leading to difficulties in quickly locating items, or confirming whether or not an item has already been packed. More importantly, for parents of young children there is a need for the parent to know and understand what has and has not been packed by the child.

The psychology of packing can be implemented to create organizational awareness particularly in children. This invention is created in order to change the thought process surrounding the packing experience.

There is a need for an efficient and fun item of luggage on the market for children. A luggage bag is needed that promotes a child's interest in organization and excitement to pack on their own. A bag is thus need that will allow parent to efficiently know and identify all items and their respective location within the packed bag saving time during the packing and unpacking process.

There is a need for a bag that eliminates the "I feel like I forgot something" feeling with item of luggage or bag with adjustable and labeled compartments where the labels are portable yet securable in the bag so you the user can move them from compartment to compartment as well as switch them out for different labels.

In addition, there is a need for a mobile electronic application that communicates with the item of luggage or bag in order to provide the user with a mobile confirmation of compartments being filled with appropriate items, in particular where a child completes the packing and the parent can be electronically updated as to progress.

SUMMARY OF THE INVENTION

I have discovered an item of luggage an organizational structure with compartments identified on an accompanying and portable checklist and in some cases an electronic checklist.

In first aspect, one embodiment of the present invention includes an item of luggage includes a luggage body having a plurality of interior walls where the interior walls are flexible and securable to the luggage body such that interior walls are structured and arranged to form a plurality of selectively sized compartments therein; a plurality of transparent covers releasably securable to each of the compartments, each cover having a label capable of being repeatedly marked and erased for identification of contents within the respective compartments; a luggage body cover hinged and releasably latched to the luggage body, the luggage body cover having a series of interior and exterior pockets; an erasable marking board releasably secured to the luggage body having compartment identification labels thereon, and a sensor disposed in at least one of the compartments, the at least one sensor capable of communicating with a mobile device having an application programmed to track status of the contents within the compartments.

Some embodiments include at least one set of color coordinated walls. Some embodiments include a computer in communication with the sensors, where the computer has components necessary to allow for communication with a wireless telecommunications network, communication with wi-fi network, and a nearfield field connection system. Some embodiments include item sensors that are further capable of communicating the contents of the respective compartments in a real-time basis to the mobile device. Some embodiments include the luggage body cover having a sensor capable of transmitting a signal to a mobile device confirming that the item if luggage is packed and secured.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

FIG. 3 depicts an exemplary label board according to one embodiment of the present invention.

DETAILED DESCRIPTION OF THE PREFERRED EMBODIMENTS

Figure 1:
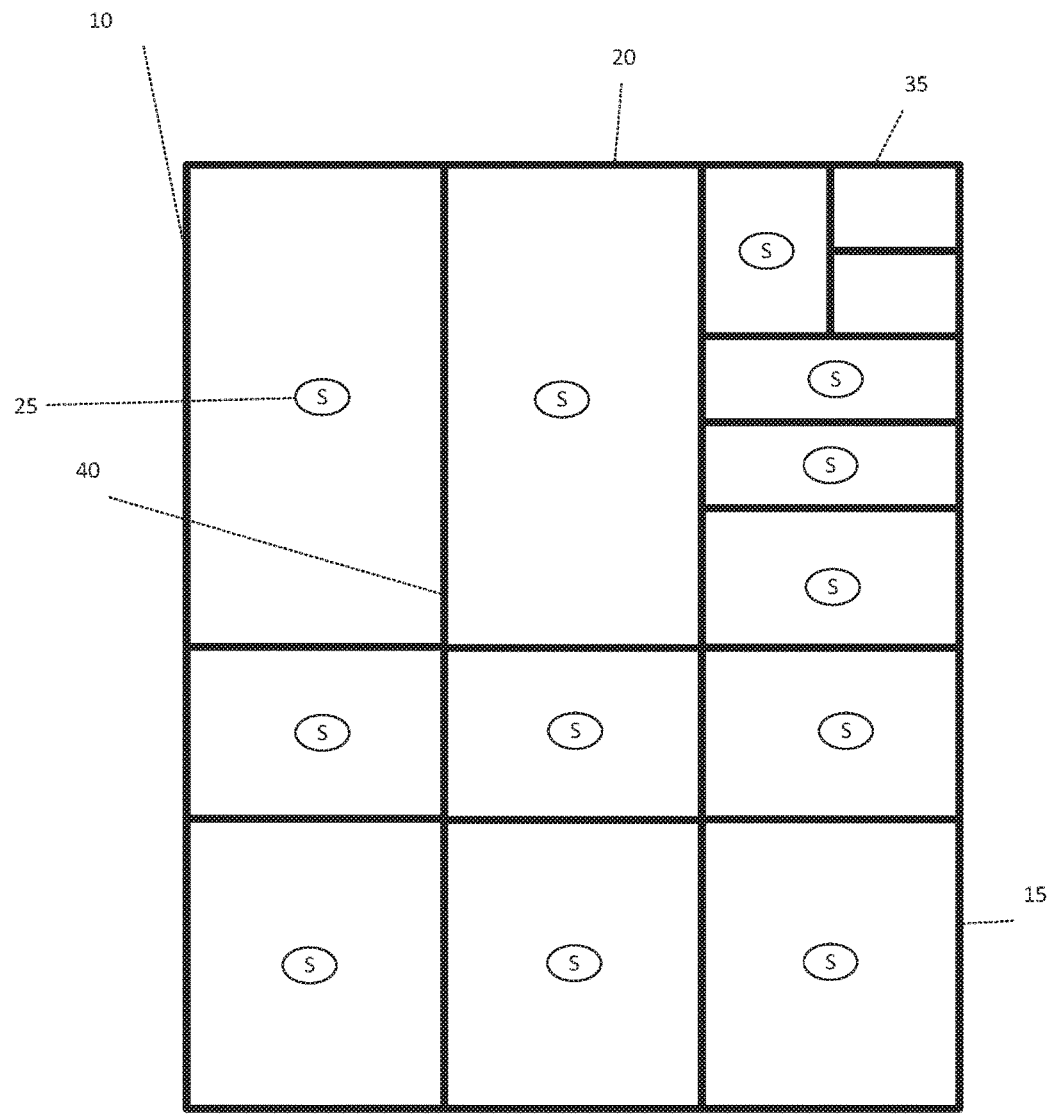
FIG. 1 depicts a schematic of a bag according to one embodiment of the invention.

The present disclosure will now be described more fully with reference to the Figures in which an embodiment of the present disclosure is shown. The subject matter of this disclosure may, however, be embodied in many different forms and should not be construed as being limited to the embodiments set forth herein.

The item of luggage according to the present invention may include multiple compartments that can be adjusted using movable walls/borders to create larger or smaller compartments. Some embodiments may include removable toiletry bag as well as removable travel jewelry bag. Both contain labeled compartments as well.

The built-in check list enables the user to write in additional items that are not included on the checklist or not included on the existing labels. The bag according to the present invention is designed to grow with the child where all labels and compartment walls can be removed if desired if older kids/teens choose not to use them. In addition, versions suitable for girls, boys, babies and teens can be proved as well.

Embodiments of the invention include an item of luggage having a built-in checklist. The item of luggage may be a suitcase, a carrying bag or a duffle bag. For instance, embodiments of the present invention may be a duffle (suitcase-type) bag with covered and labeled compartments/sections that are visible when the top is opened. The bag can be carried with a padded strap or perhaps can be pulled on wheels. Having wheels may be better for kids and easier for parents. Embodiments of the bag may include labeled compartments. Compartments may have transparent plastic covers that can be reached into and may easily snap back into place when the user's hand is removed. For example, the plastic covers may be transparent, allowing you to see the contents (or lack of), but the plastic top has a slit and pops back into place when the user removes the user's hand. Embodiments of the transparent cover may be comprised of plastic, rubber, and the like. The material may be dependent on a quality, a deflection of the cover, a usage, etc.

Moreover, the bag may be made of various materials, and may be washable. Embodiments of the bag may be rectangular in shape, and a top of the bag may be opened and closed with a zipper, just like a standard suitcase. When opened, a full top may fall over to one side of the bag. The cover of the bag may also have pockets and compartments as well. An opened bag may present covered "sections" which can be labeled based upon a common checklist of travel items for kids. Embodiments of the bag may be tailored to an individual or need for various items. For instance, one embodiment of the bag may be for carrying items associated with babies, having a different check list and different sized "sections"/labeled compartments than for a bag meant for a teenager. The compartments for a baby version of the bag may include: Diapers, Diaper rash cream, bottles, baby wipe holders, thermometers, pacifiers, pajamas, medicine, sleep toys, outfits, Q-tips, blankets, socks, body wash, snacks, extra shoes, washed clothes, hats, hamper, and the like.

In an exemplary embodiment, the bag may be meant for kids. The compartments may each be labeled as follows: Socks, Underwear, Shirts, Pants/Shorts, Pajamas, Sweatshirt, Tablet/Phone & Charger (with extra padding and it may be removable), "Hamper" for the dirty clothes, and the like. The Hamper may include a removable bag with built in air vents to eliminate odor. The bag may further include a checklist of other/misc. items, wherein the checklist may be built into an inside top of the bag. An accessories section, including snap closed hooks to properly keep jewelry (necklaces, bracelets, earrings etc.) in place may also be built into the inside cover of the bag. The built-in checklist may be visible when the bag is opened and can be useful while packing. Embodiments of the bag may include a checklist with Misc. Items on the checklist, which may include: Summer Items, Winter, Thermometer, Medicine, Qtips, Sunscreen, Hats, Extra shoes/slippers, Bathing Suits, Gloves, Blanket/Pillow, Water bottle/Snacks, and the like. An inside wall of the bag may be a toiletry section. All items may be able to stand upright to prevent them from tipping over and spilling. Embodiments of the toiletry section may be a covered and zippered compartment to keep items in place and can prevent liquid items from spilling over into the clothes. A lining of the toiletry section may be removable for easy cleaning (in case a liquid item does open and spill). Embodiments of the toiletry section may also be labeled to include the following: Toothbrush, Toothpaste, Hairbrush, Bodywash, Shampoo/Conditioner, and Accessories.

Embodiments of the bag may be useful for Kids: allows kids to feel like "big kids" and pack on their own; Mom/Dad: Allows mom and dad to easily check the contents of the bag and make sure nothing is missing, also gives parents reassurance that the babysitter/grandma/grandpa can find things easily, and helps keep mom efficient and gives her better time management; and Grandma/Grandpa: eliminates confusion for grandma/grandpa while looking for certain items or trying to figure out what is clothes vs PJs., and also allows them to know what's missing when repacking the bag when the kids are going home.

Moreover, the disclosed features of the bag may keep the bag neat and organized, decreases packing time. When the bag is returned home, the user knows which clothes are clean and which are dirty. Also, the disclosed bag may keep the items in place and eliminates them from being on top of each other or everything from falling to one side. Embodiments of the bag may also eliminate the need to carry along an additional toiletry bag and jewelry holder bag. Embodiments of the bag may also help a dad or caregiver pack the bag easily when mom is not around.

Other embodiments of the bag may include a gender-specific look, or may be designed for various personalities, (e.g. fuzzy, classic, preppy, bling etc.). Embodiments of the bag may come in multiple colors, and may include monogramming on the outside of the bag or a logo. The bag can be provided a Transportation Security Agency compliant lock.

In some embodiments the bag according to the present invention can include means of electronically notifying a user or the user's parent when each compartment is filled with the respective item. Such means can include electronic sensors interconnected to a mobile computer device embedded within the back. Where the mobile computing device is structured and arranged to communicate wirelessly to a mobile device incorporating a software application programmed to monitor the contents of the bag. Included in the software program are instructions to identify when each pre-selected category of item to be inserted into the bag is in fact placed therein. The mobile device can be updated in real time as to the progress of packing by the user and when such packing is complete.

Each compartment can include sensors such as RFID, weight based sensors, motion detectors, tag identifiers, product identifiers, scanners, bar code readers or other similar identification means.

In addition, the removable list can include a bar code to be used by the user child to take a picture or scan thereof with there mobile device. In which case the user child's mobile device can forward a communication to the user's parent's mobile device providing real time progress on packing.

In addition, the electronic sensors included therein can provide additional data such as the status of the cleanliness of the items therein, the weight of each compartment, the total weight of the bag and the specific location of the bag. The electronic sensors and the mobile computer device can include GPS locators, and communication hardware sufficient to communicate with Wi-Fi networks or mobile telecommunications networks.

Referring now to FIG. 1 there is shown a side interior schematic view of bag 10 consistent with the present invention. Bag 10 can be equipped with wheels that rotate and traverse (not shown). Bag 10 is equipped various compartments 20. Each compartment 20 has removeable, flexible and yet securable walls 40 enclosed therein. Walls 40 are movable and can be secured to the exterior of bag 10 via Velcro or other similar releasable securing means. As such each of the compartments 20 are therefore configurable into selective sizes customized for the type of trip and the traveler. Material covering bottom inside portion of bag are Velcro connection friendly. Some embodiments can contain three main flexible walls will be included as well as two smaller walls to help make smaller compartments if desired. Some embodiments include color coordinated walls. All interior compartment walls and labels are removable and interchangeable. There can also be included storage flaps that fall over to the sides of the bag. When pulled together over the top of the bag they will snap closed.

Each compartment 20 can be covered with a clear cover and label again designed to be removably fixed to each respective compartment. Each of the labels can be assigned according to the label sheet as shown in FIG. 3.

Each of the compartments may include a sensor S identified as reference numeral 25. Bag 10 can be equipped with any number of sensors S depending upon the number of compartments 20 configured therein.

Sensors S can be connected via hard wire or wirelessly to a local computer housed within bag 10, such in compartment 35. Compartment 35 may include all power connection and battery requirements necessary for an operating computer. In addition, the power and battery provided herein can be sources for a mobile device connection for power charging or data transfer as needed, such as having a USB or lightning charger port on the interior and exterior of the bag. A retractable power cord can also housed within compartment 35 as well.

Sensors S and the computer in compartment 35 can be equipped with wireless connectivity suitable to transfer data through local area networks, Wi-Fi, and mobile telecommunications item of luggage. The connectivity is structured and arranged to connect to a mobile device having a suitable application operating thereon allowing the user's parent to receive real time updates as to the status of packing of bag 10.

In addition, a compartment can be labeled as soiled clothing, such as compartment 15, which can be labeled hamper, in the lower portion of bag 10. Sensor S in compartment 15 can be programmed to identify soiled clothing and through a wireless connection report the status of the soiled items therein to the user's parent's mobile in advance of a return home.

The sensor S can include electronics to operate a Near Field Item of luggage (NFC) applied between the item of luggage and a mobile terminal so that the bag can be tracked through an airport, or other carrier's item of luggage.

In other embodiments sensor S can include a biometric sensor and an alarming device secured to the exterior surface of the item of luggage.

In some embodiments the sensor s includes a short-range radio technology such as Bluetooth. The item of luggage can be further able to communicate with at least one tagged object 2 via NFC. The mobile device may be a smart phone, a tablet computer, or a multimedia
player. A tagged object can include any item having an NFC tag, and may be a document, or item of clothing placed or needing to be placed within the item of luggage.

The mobile application can be programmed to identify in real time the contents of the item of luggage, its location and whether the contents require washing.

Figure 2:
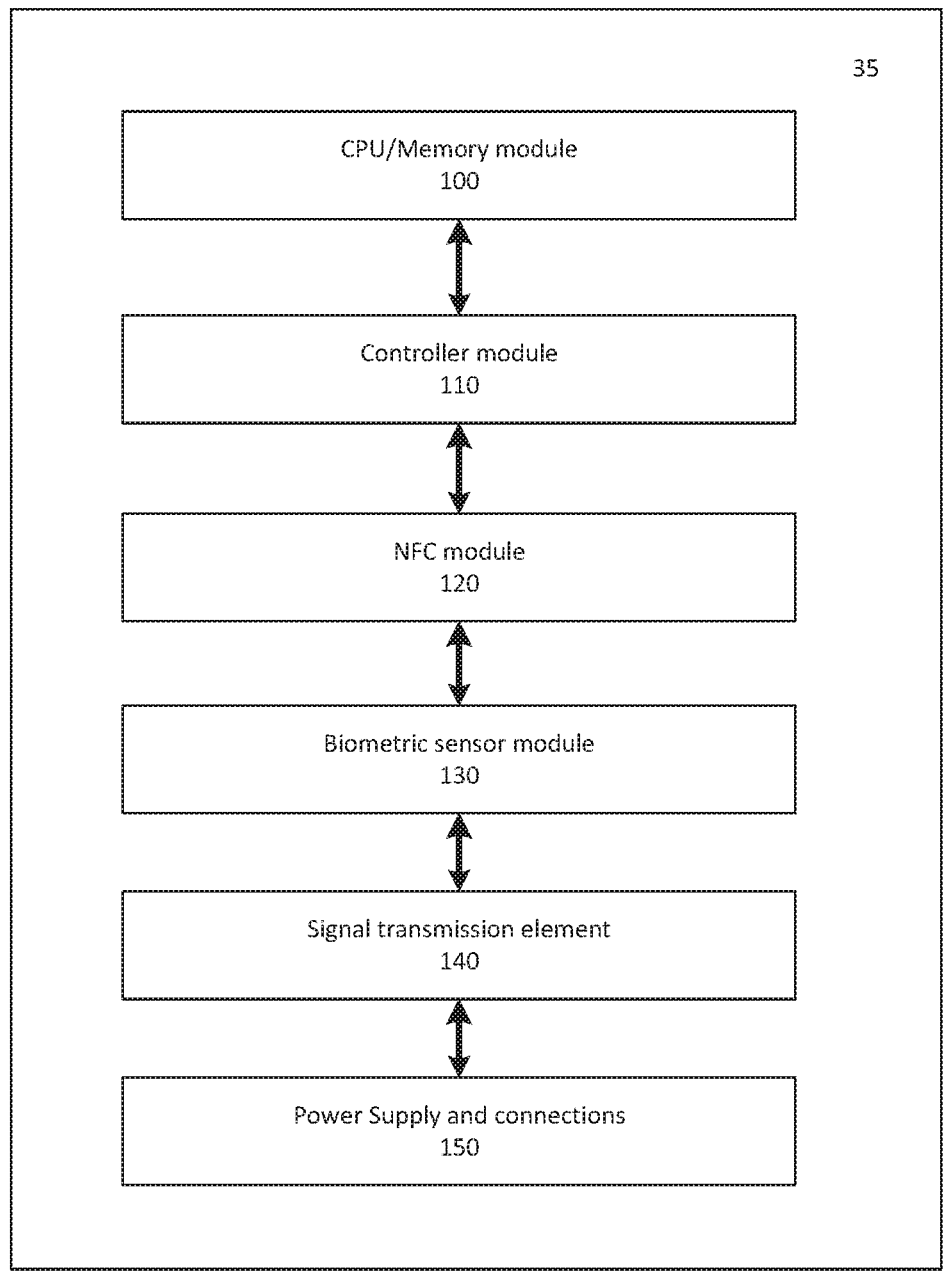
FIG. 2 depicts a schematic of a compartment housing various electronic elements according to one embodiment of the invention.

Referring now to FIG. 2 there is a large view of compartment 35 housing the various electronic components associated with item of luggage. Compartment 35 can house a CPU/memory module 100, a controller module 110, an NFC module 120, a biometric sensor module 130, a signal transmission module 140 and a power supply and connection module 150. Each of these elements are in electrical communication with each other and the various sensor S through the item of luggage. In addition, each of the modules have wireless communication capabilities and protocols such that a user's parent can be notified in real time as to the progress of items placed within each of the various compartments within item of luggage 10.

FIG. 3 represent a board having a chart identifying various respective labelled compartments so that the user may track progress of packing the item of luggage. In some embodiments the mobile application includes an electronic version of the chart. The mobile application can be resident on the user child's electronic device, such as an iPad or other similar device. In this way the user child can check off items that been packed and have that confirmed by the item of luggage via the already described sensor and electronics and maintain the child's parent up to date in real time as to the progress of the packing.

It will be apparent to one of skill in the art that described herein is a novel a bag with a removable checklist. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. An item of luggage comprising:
a luggage body;
the luggage body having a plurality of interior walls where the interior walls are flexible and securable to the luggage body such that interior walls are structured and arranged to form a plurality of selectively sized compartments therein;
a plurality of transparent covers releasably securable to each of the compartments, each cover having a label capable of being repeatedly marked and erased for identification of a series of separate and distinct items contained and secured within each respective compartment;
a luggage body cover hinged and releasably latched to the luggage body, the luggage body cover having a series of interior and exterior pockets;
an erasable marking board releasably secured to the luggage body having compartment identification labels thereon; and
a sensor disposed in at least one of the compartments, the at least one sensor capable of communicating with a mobile device having an application programmed to track status of the series of separate and distinct items contained and secured within each respective compartment, the sensor configured to determine a soil level of the series of separate and distinct items contained and secured within each respective compartment and to provide an alert to said mobile device as to said soil level at a predetermined time.

2. The item of luggage according to claim 1, where the interior walls include at least one set of color coordinated walls.

3. The item of luggage according to claim 1 further comprising computer in communication with the sensors, the computer having components necessary to allow for communication with a wireless telecommunications network, communication with wi-fi network, and a nearfield field connection system.

4. The item of luggage according to claim 3 where the sensors are further capable of communicating the contents of the respective compartments in a real time basis to the mobile device.

5. The item of luggage according to claim 1 where the luggage body cover includes a sensor capable of transmitting a signal to a mobile device confirming that the item if luggage is packed and secured.

* * * * *

UNITED STATES PATENT AND TRADEMARK OFFICE
CERTIFICATE OF CORRECTION

PATENT NO. : 10,210,742 B2
APPLICATION NO. : 15/819134
DATED : February 19, 2019
INVENTOR(S) : Marcella Abbott Page 1 of 1

It is certified that error appears in the above-identified patent and that said Letters Patent is hereby corrected as shown below:

In the Claims

At Column 7, Line 7, please change "if" to -- of --.

Signed and Sealed this
Nineteenth Day of March, 2019

Andrei Iancu
*Director of the United States Patent and Trademark Office*